United States Patent
Rubens et al.

(10) Patent No.: US 9,561,569 B2
(45) Date of Patent: Feb. 7, 2017

(54) WOBBLE DRIVE FOR AN OSCILLATING TOOL

(71) Applicants: Robert Bosch Tool Corporation, Broadview, IL (US); Robert Bosch GmbH, Stuttgart (DE)

(72) Inventors: Jeremy Rubens, Palatine, IL (US); Jaime Moreno, Arlington Heights, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 470 days.

(21) Appl. No.: 14/109,889

(22) Filed: Dec. 17, 2013

(65) Prior Publication Data
US 2014/0182872 A1    Jul. 3, 2014

Related U.S. Application Data

(60) Provisional application No. 61/747,859, filed on Dec. 31, 2012.

(51) Int. Cl.
*B23Q 5/02*    (2006.01)
*B27B 19/00*    (2006.01)
(Continued)

(52) U.S. Cl.
CPC ................ *B23Q 5/02* (2013.01); *B24B 23/04* (2013.01); *B24B 47/16* (2013.01); *B26B 7/00* (2013.01); *B27B 19/006* (2013.01)

(58) Field of Classification Search
CPC ................ B25F 5/02; B23Q 5/10; B23Q 5/02; B24B 23/04
(Continued)

(56) References Cited

U.S. PATENT DOCUMENTS 2,639,620 A * 5/1953 Bamford ................. F16H 23/04
  451/356
3,337,952 A * 8/1967 Rosen .................. B23D 49/006
  30/277.4

(Continued)

FOREIGN PATENT DOCUMENTS

EP    0372376 A2    6/1990

OTHER PUBLICATIONS

International Search Report and Written Opinion corresponding to PCT Application No. PCT/US2013/077789, mailed Apr. 14, 2014 (9 pages).

*Primary Examiner* — Nathaniel Chukwurah

(74) *Attorney, Agent, or Firm* — Maginot Moore & Beck LLP

(57) ABSTRACT

An oscillating drive for a power tool includes a wobble shaft located on a drive shaft of a motor for a power tool, and a wobble member rotatably supported on the wobble shaft. The wobble member includes a wobble drive structure that defines a drive axis. A tool driver includes a tool drive structure at one end that is coupled to the wobble drive structure and a tool holder configured to releasably retain an accessory tool. Rotation of the drive shaft causes the wobble shaft to wobble about an axis of the drive shaft. The tool driver holds the wobble member against the rotation of the wobble shaft such that the wobble member wobbles without rotating which results in an oscillating motion of the drive axis of the wobble member in a plane that is parallel to the axis of the drive shaft. The oscillating motion of the drive axis causes the tool driver to oscillate.

16 Claims, 13 Drawing Sheets

(51) Int. Cl.
*B24B 23/04* (2006.01)
*B24B 47/16* (2006.01)
*B26B 7/00* (2006.01)

(58) Field of Classification Search
USPC .... 173/39, 109, 213, 214; 30/219, 369, 392; 74/50; 451/24, 357
See application file for complete search history.

(56) References Cited

U.S. PATENT DOCUMENTS

| | | |
|---|---|---|
| 7,704,254 B2 | 4/2010 | Walen |
| 7,707,729 B2 | 5/2010 | Moreno |
| 8,109,809 B2 | 2/2012 | Bohne et al. |
| 2011/0036609 A1 | 2/2011 | Blickle et al. |

\* cited by examiner

WOBBLE DRIVE FOR AN OSCILLATING TOOL

CROSS-REFERENCE TO RELATED APPLICATIONS

This application claims priority to U.S. Provisional Application Ser. No. 61/747,859 entitled "WOBBLE DRIVE FOR AN OSCILLATING TOOL" by Rubens et al., filed Dec. 31, 2012, the disclosure of which is hereby incorporated herein by reference in its entirety.

TECHNICAL FIELD

This disclosure relates to the field of oscillating power tools, and more particularly to accessory tools for use with oscillating power tools.

BACKGROUND

In general, oscillating tools are light-weight, handheld power tools capable of being equipped with a variety of tool accessories and attachments, such as cutting blades, sanding discs, grinding tools, and many others. These types of tools typically include a generally cylindrically-shaped main body that serves as an enclosure for an electric motor as well as a hand grip for the tool. The electric motor oscillates a spindle having a tool holder to which any one of various accessory tools may be attached. As the spindle is oscillated, an accessory tool attached to the tool holder is driven to perform a particular function, such as sanding, grinding, or cutting, depending on the configuration of the accessory tool.

Oscillating tools include an oscillating drive that converts rotational movement of the output shaft of the motor to an oscillating movement that is used to drive the spindle. In most previously known oscillating tools, the oscillating drive uses an eccentric mechanism for producing the oscillating movement. For example, in some tools, the output shaft of the motor is received in an eccentric bearing. In other cases, the output shaft of the motor includes an eccentric drive pin that is received in a normal bearing. In either case, the spindle is held by a fork structure that is mounted onto the bearing and that extends from the bearing to position the spindle in front of the output shaft. As the output shaft is rotated by the motor, the eccentric bearing or the eccentric drive pin shifts the fork from side to side which causes the spindle to oscillate.

While effective, eccentric drives for oscillating tools are limited in the amount of stroke that can be generated, the size of the blade that the tool can be effectively driven, and the inertia of the blade. In addition, oscillating drives are susceptible to vibrations caused by the oscillating mass of the oscillating mechanism. The vibration introduced is a combination of the inertia of the mechanisms along with the movement of the center of gravity of the mechanism. Eccentric drives have a configuration that makes it difficult to drive a counterbalance to counter the vibrations caused by the oscillating mechanism. Eccentric drives are also faced with the issue of loss of stroke due to flexing of the housing. Under heavy cutting loads, the housing of the tool can flex, causing the output stroke of the tool to be reduced. This impacts tool performance. To address this issue, some oscillating tools have been provided with reinforced housings which can increase the cost of the tool.

What is needed is an oscillating drive for an oscillating tool that is robust, is less susceptible to vibrations, can handle heavy cutting loads without a reduction in stroke, and can be easily counterbalanced and that does not require an increase in the size or dimensions of the housing to accommodate the drive.

DRAWINGS

DESCRIPTION

Figure 1:
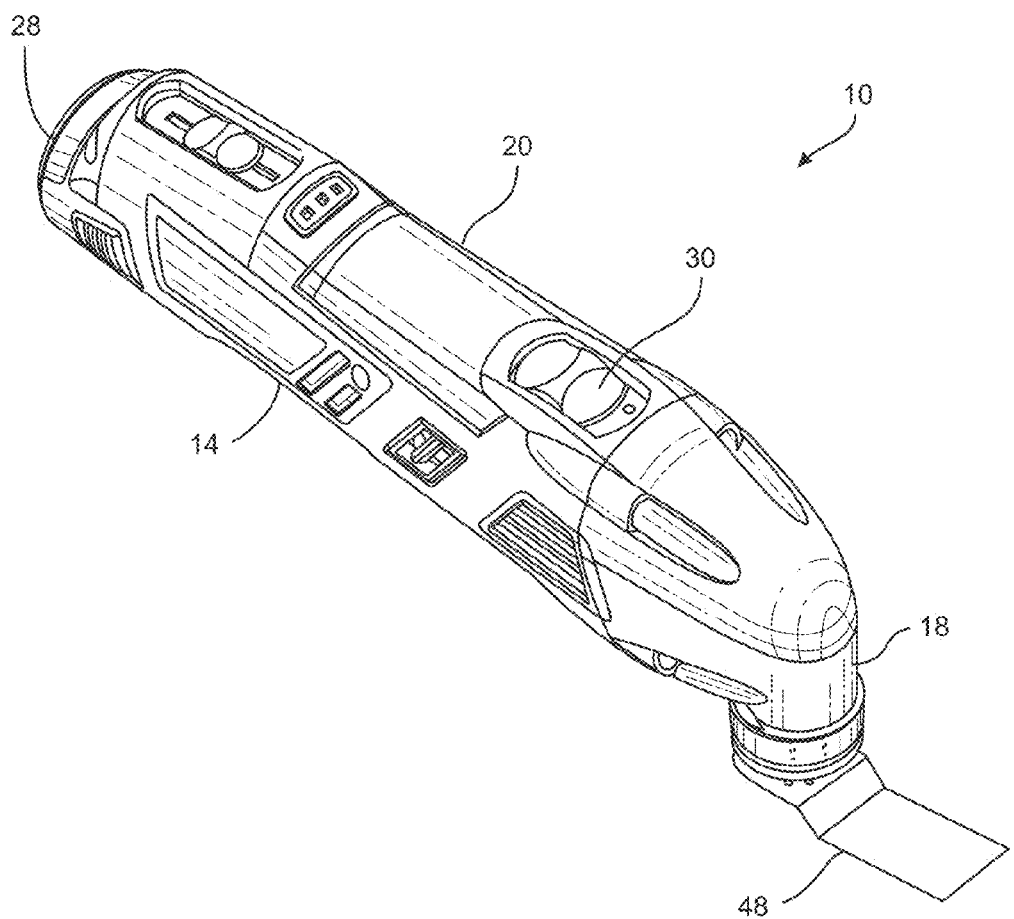
FIG. 1 is a perspective view of an oscillating tool including a wobble drive mechanism in accordance with the present disclosure.

For the purposes of promoting an understanding of the principles of the disclosure, reference will now be made to the embodiments illustrated in the drawings and described in the following written specification. It is understood that no limitation to the scope of the disclosure is thereby intended.

It is further understood that the present disclosure includes any alterations and modifications to the illustrated embodiments and includes further applications of the principles of the disclosure as would normally occur to one of ordinary skill in the art to which this disclosure pertains.

In accordance with one embodiment, an oscillating drive for a power tool includes a wobble shaft located on a drive shaft of a motor for a power tool, and a wobble member rotatably supported on the wobble shaft. The wobble member includes a wobble drive structure that defines a drive axis. A tool driver includes a tool drive structure at one end that is coupled to the wobble drive structure and a tool holder configured to releasably retain an accessory tool. Rotation of the drive shaft causes the wobble shaft to wobble about an axis of the drive shaft. The tool driver holds the wobble member against the rotation of the wobble shaft such that the wobble member wobbles without rotating which results in an oscillating motion of the drive axis of the wobble member in a plane that is parallel to the axis of the drive shaft. The oscillating motion of the drive axis causes the tool driver to oscillate.

This disclosure is directed to an oscillating tool 10 equipped with a wobble drive mechanism for converting the rotational output of the tool's motor to an oscillating motion of the tool driver, or oscillation member. The wobble drive mechanism is more robust and less prone to vibration than the eccentric-type drives of previously known oscillating tools which can increase the life of the tool and allow the tool to have an increased stroke, increased speed, and to be used with longer blades. The wobble drive mechanism also addresses the issue of loss of stroke under load by internalizing the mechanism loads and reducing the bearing loads on the housing so the housing will have less of a tendency to flex under heavy loads. As discussed below, the wobble drive mechanism has a configuration that does not require as much of an offset in front of the motor so the length of the tool does not have to be increased and may actually minimizes the forward extension of the mechanism so the length of the tool can be decreased relative to tools having previously known drives.

Figure 2:
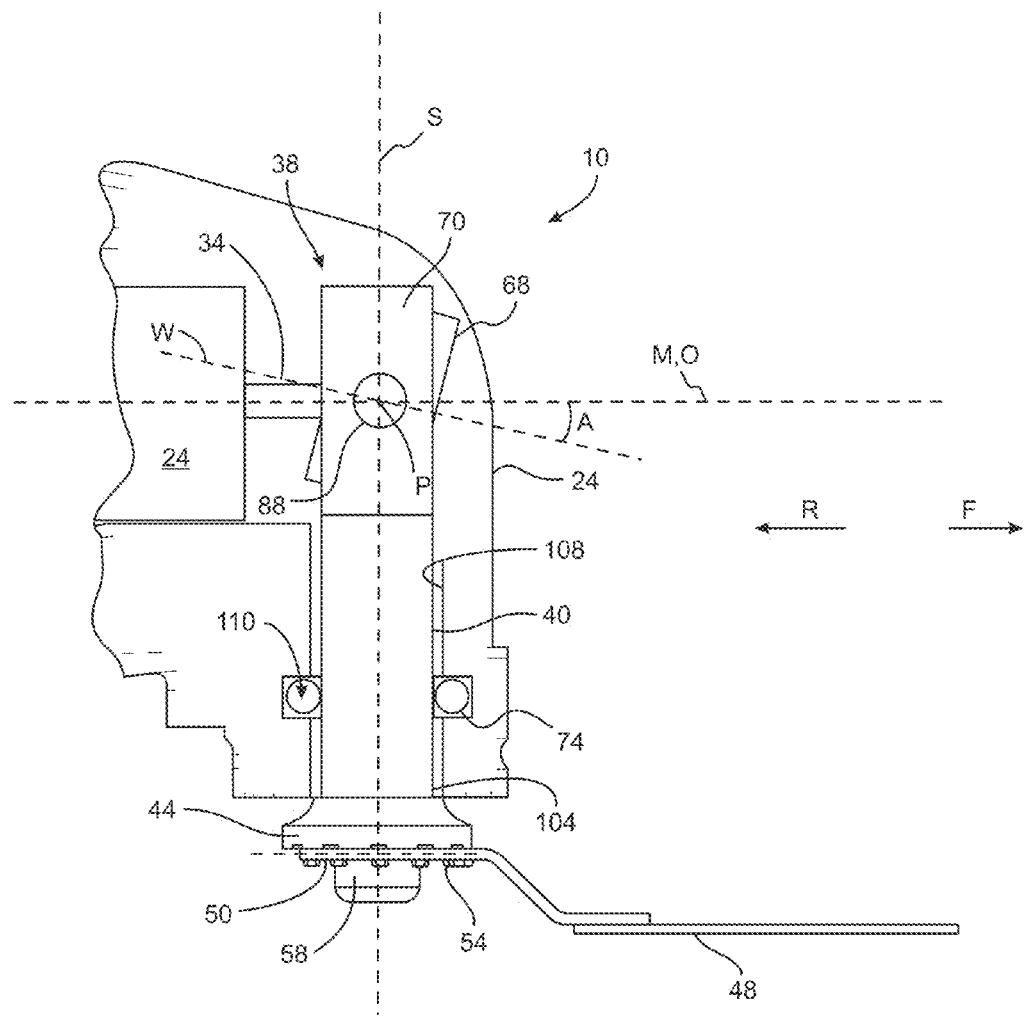
FIG. 2 is a partial fragmentary view of the oscillating tool of FIG. 1 showing the wobble drive mechanism.

Referring to FIG. 1, the oscillating tool 10 includes a generally cylindrically shaped housing 14 constructed of a rigid material such as plastic, metal, or composite materials such as a fiber reinforced polymer. The housing 14 includes a nose portion 18 and a main body portion 20. The main body portion 20 serves as the handle for the tool 10 and encloses a motor 24 (FIG. 2). In one embodiment, the motor 24 comprises an electric motor configured to receive power from a rechargeable battery 28 connected at the base of the main body portion 20. In other embodiments, electric power for the motor may be received from an AC outlet via a power cord (not shown). Power to the motor is controlled by a power switch 30 provided on the handle portion 20 of the housing 22.

As depicted in FIG. 2, the motor 24 includes a drive shaft 34 that is configured to be rotated by the motor about a motor axis M. The drive shaft 34 is coupled to a wobble drive mechanism 38 that is configured to convert the rotational movement of the drive shaft 34 to an oscillating drive motion for the tool driver, or oscillation member 70. In the embodiment of FIG. 2, the oscillation member 70 includes a spindle 40 that defines a spindle axis S that is arranged substantially perpendicular to the motor axis M. The motor 24 and wobble drive mechanism 38 are configured to oscillate the spindle 40 about the spindle axis S at high frequencies, e.g., 5,000 to 25,000 oscillations per minute, with a small oscillating angle, typically in a range of between 0.5° and 7°.

The spindle 40 supports an accessory tool holder 44 exterior to the nose portion 18 of the housing 14. The tool holder 44 is configured to releasably secure various accessory tools to the spindle, such as the cutting blade accessory tool 48. As the tool holder 44 is oscillated by the spindle 40, the accessory tool 48 is driven to oscillate about the axis S. To enable a secure connection between the tool holder 44 and accessory tools for use with the power tool 10, the tool holder 44 and associated accessory tools are provided with complementary drive structures 54 that mate to secure the accessory tool to the tool holder.

In one embodiment, the tool holder 44 includes a drive structure 50 that comprises a plurality of protrusions arranged in a circular pattern about a central bore (not shown). In this embodiment, the accessory drive structure 54 includes a plurality of openings or recesses and a central opening that are sized, shaped, and positioned complementary to the protrusions and central bore, respectively, of the tool drive structure 50. When the accessory tool 48 is placed onto the tool holder 44, the protruding features of the drive structure 50 are received in the corresponding openings and/or recesses defined in the accessory drive structure 54. A clamping member 58, such as a clamping screw, is used to press the accessory drive structure 54 of the accessory tool 48 into interlocking engagement with the drive structure 50 thus securing the accessory tool 48 to the tool holder 44. The interlocked drive structures 50, 54 enable the oscillating movement of the tool holder 44 to be imparted to the accessory tool 48.

Referring to FIGS. 2-8, the wobble drive 38 includes a wobble shaft 60, a wobble bearing 64, a wobble member 68, and an oscillation member 70. The wobble shaft 60 is positioned on the drive shaft 34 of the motor 24. The wobble shaft 60 may be formed integrally with the drive shaft 34 or may comprise a separate element that is attached to the drive shaft 34. The wobble shaft 60 has an outer surface 78 that defines a cylindrical shape centered on a longitudinal axis W, referred to herein as the wobble axis. The wobble shaft 60 is arranged on the drive shaft 34 with the wobble axis W offset obliquely from the motor axis M by an angle A, referred to as the wobble angle. The point P where the wobble axis W and the motor axis M intersect is referred to herein as the wobble fulcrum P. As the drive shaft 34 rotates about the axis M, the orientation of the wobble axis W changes thereby causing the wobbling motion of the wobble member 68 about the wobble fulcrum P.

The wobble bearing 64 comprises a ball bearing or roller bearing that is rotatably positioned on the wobble shaft 60. The wobble member 68 in turn is positioned on the wobble bearing 64. The wobble bearing 64 serves to decouple the wobble member 68 from the rotational movement of the wobble shaft 60 and drive shaft 34. The wobble member 68 includes an inner surface 80 that defines a cylindrically-shaped opening sized to receive the wobble bearing 64. The wobble member 68 also includes an outer surface 84 that defines a cylindrically-shaped peripheral shape for the wobble member 68.

The wobble member 68 includes wobble drive structures 88 located in or on the outer surface 84. In the embodiment of FIGS. 2-8, there are wobble drive structures 88 located on opposite sides of the wobble member 68. The wobble drive structures 88 project outwardly from the outer surface 84 and have a trunnion-like configuration aligned on an axis X, referred to herein as the drive axis. When the wobble member 68 is positioned on the wobble bearing 64 with the wobble bearing 64 on the wobble shaft 60, the drive axis X intersects the wobble fulcrum P. As a result, the drive axis X intersects both the axis of rotation M of the drive shaft 34 and the wobble axis W of the wobble shaft 60.

Figure 3:
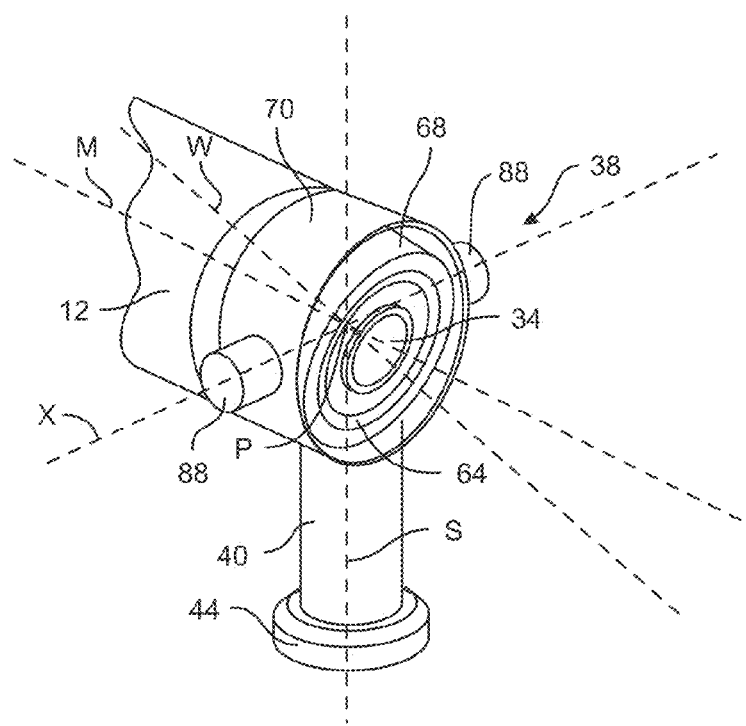
FIG. 3 is a perspective view of the wobble drive mechanism of FIG. 2.
Figure 4:
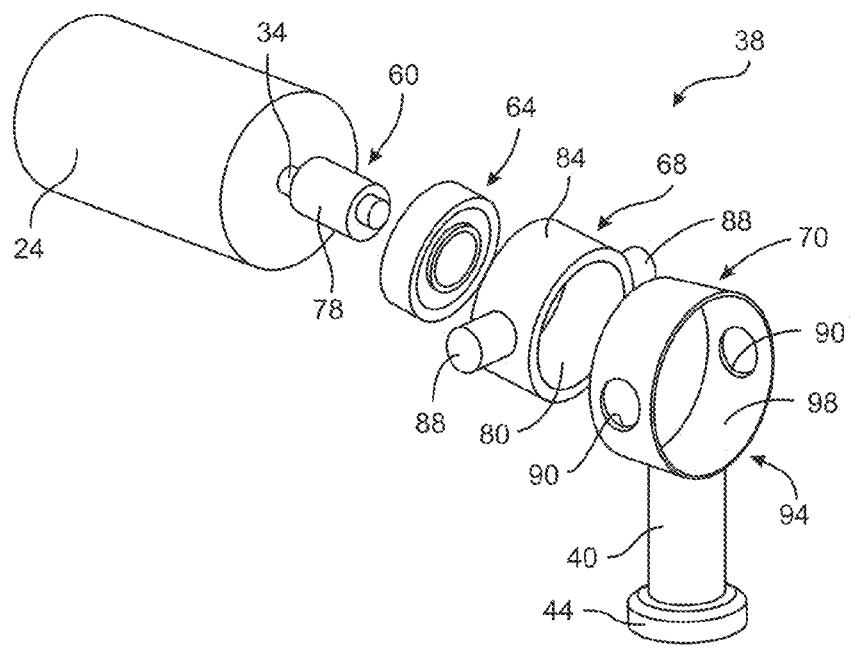
FIG. 4 is an exploded view of the wobble drive mechanism of FIG. 3.
Figure 8A:
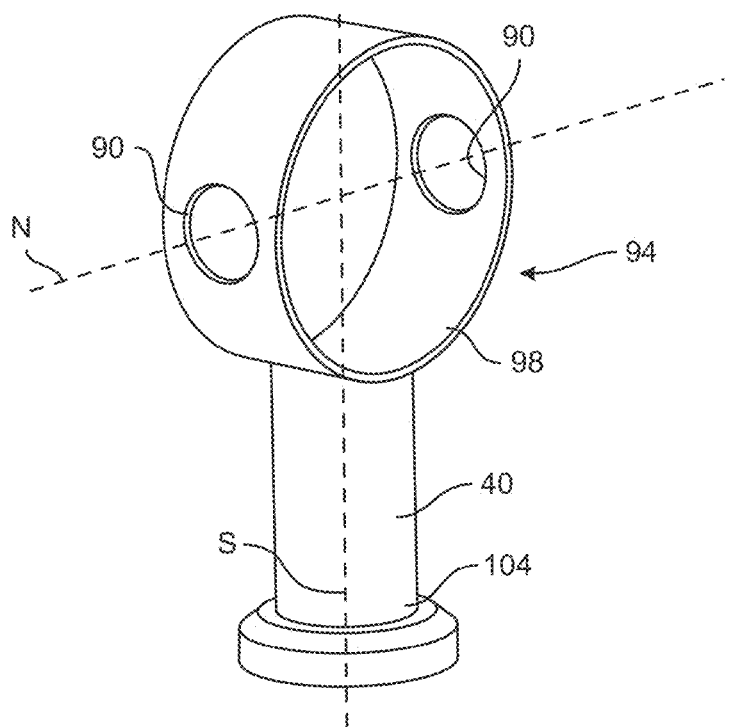
FIG. 8A is a perspective view of the oscillation member of the wobble drive mechanism of FIG. 2.
Figure 8B:
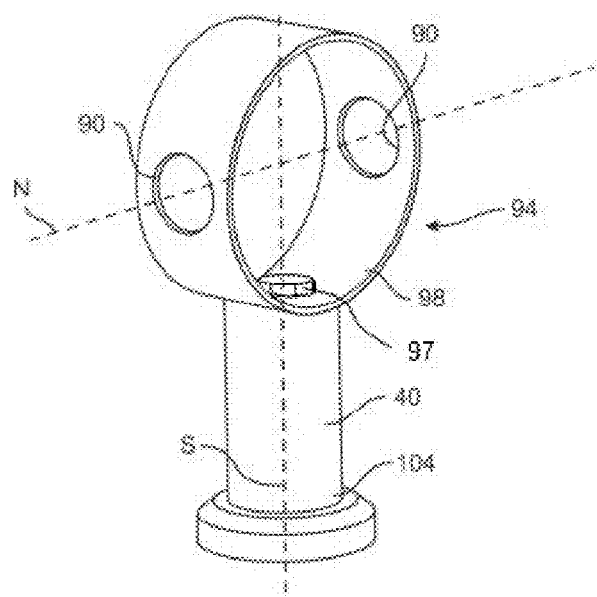
FIG. 8B is a perspective view of an alternative embodiment of the oscillation member of FIG. 8A.

Referring to FIG. 8A, the oscillation member 70 includes a mounting portion 94 and a spindle portion 40. As depicted in FIG. 3, the wobble drive structures 88 of the wobble member 68 are configured to be connected to complementary mating features 90 provided on the mounting portion 94 of the oscillation member 70. In one embodiment, the mounting portion 94 and the spindle portion 40 are permanently affixed to each other to form a single part. Alternatively, the mounting portion 94 and spindle portion 40 may comprise separate components that are fastened together with a fastener structure 97, such as a screw or bolt, as depicted in FIG. 8B.

Figure 8C:
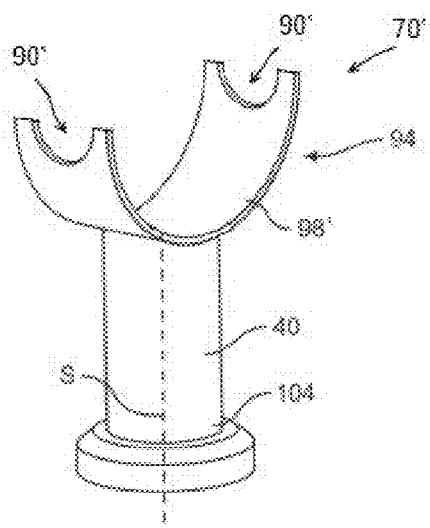
FIG. 8C is a perspective view of another alternative embodiment of the oscillation member of FIG. 8A.
Figure 8D:
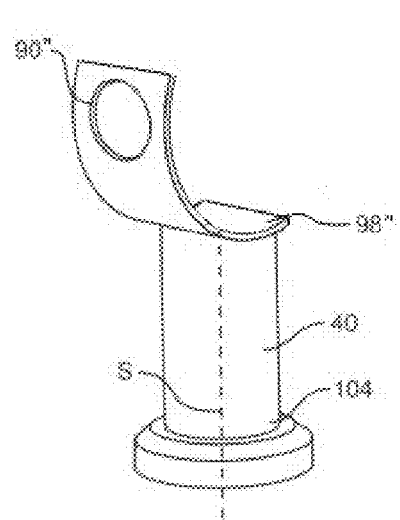
FIG. 8D is a perspective view of a yet another alternative embodiment of the oscillation member of FIG. 8A.

In the embodiment of FIG. 8A, the mounting portion 94 of the oscillation member 70 has a spindle drive structure with a yoke-like configuration formed by a wall 98 that extends around at least a portion of the outer surface 84 of the wobble member 68 from the wobble drive structure 88 on one side of the wobble member to the wobble drive structure 88 on the other side of the wobble member. As depicted in FIG. 8A, the wall structure 98 has a cylindrical configuration that is sized to extend completely around the outer surface 84 of the wobble member 68. In alternative embodiments, the wall structure 98 of the mounting portion 94 may extend only partially around the outer wall from one wobble drive structure 88 to the other. For example, FIG. 8C depicts an embodiment of an oscillation member 70' that includes a wall structure 98' having a semi-circular configuration. The wall structure 98' of FIG. 8C includes only the lower portion of the wall structure 98 of FIG. 8A. FIG. 8D depicts another alternative embodiment of oscillation member 70" in which a wall structure 98" is configured to extend along a one side of a wobble member, i.e., approximately a quarter of the cylindrical configuration of the FIG. 8A.

In the embodiment of FIG. 8A, the mating features 90 of the mounting portion 94 comprise openings defined in the wall structure 98 that are sized and positioned complementary to the trunnion-like projections 88 on the outer surface 84 of the wobble member 68. The openings 90 are aligned on an axis N. When the oscillation member 70 is connected to the wobble member 68, the trunnion-like projections 88 are received in the openings 90. In the embodiment of FIG. 8C, the mounting structures 90' comprise semi-circular shaped recesses formed in the ends of the wall structure 98'. Of course, the mounting structures 90' may alternatively be provided as circular openings formed in the wall structure 98" as depicted in FIG. 8A. In the embodiment of FIG. 8D, the wall structure 98" includes a mounting structure 90" in the form of a circular opening similar to FIG. 8A for receiving a single mounting projection 88 on a wobble member (not shown). In alternative embodiments, the oscillation members 70, 70', 70" may be provided with male mounting structures, or projections, that are received in female mounting structures provided on the wobble member.

The spindle portion 40 of the oscillation member 70 extends longitudinally from the mounting portion 94 in a direction that is substantially perpendicular to the motor axis M. The tool holder 44 is attached to the distal end portion 104 of the spindle portion 40. In one embodiment, the spindle portion 40 is formed integrally with the mounting portion 94 of the oscillation member 70. In alternative embodiments, the spindle portion 40 can be a separate element that is secured to the mounting portion 94. The spindle portion 40 defines a spindle axis S. As depicted in FIG. 8A, the spindle portion 40 extends from the mounting portion 94 such that the spindle axis S intersects the drive axis X of the mounting portion 94. As a result, when the oscillation member 70 is positioned on the wobble member 68, the spindle axis S intersects the wobble fulcrum P. As the wobble member 68 is driven to wobble about the wobble fulcrum P, the spindle portion 40 of the oscillation member 70 is driven to oscillate about the spindle axis S.

As depicted in FIG. 2, the nose portion 18 of the housing 14 defines a passage 108 that opens to the exterior of the housing 14. The spindle portion 40 of the oscillation member 70 is rotatingly or oscillatingly supported in the passage by the spindle bearing 74. The spindle bearing 74 is a ball bearing or roller bearing mounted in a fixed position in the nose portion 18 of the housing. In one embodiment, the nose portion 18 of the housing includes walls that define a bearing space 110 where the spindle bearing 74 is retained and positioned in relation to the passage 108. The spindle portion 40 extends through the spindle bearing 74 and out of the passage 108 to the exterior of the housing. The tool holder 44 is attached to the spindle portion 40 exterior to the nose portion 18 of the housing. The tool holder 44 is configured to releasably secure the accessory tool 48 to the oscillating tool 10.

In operation, an operator of the tool presses the power switch 30 to activate the motor 24 to rotate the drive shaft 34 about the axis M. As the drive shaft 34 rotates, the wobble shaft 60 rotates causing the wobbling motion of the wobble member 68. The wobble bearing 64 decouples the wobble member 68 from the rotation of the wobble shaft 60, and the wobble member 68 is held against the rotation of the wobble shaft by the connection with the mounting portion 94 of the oscillation member 70. As a result, the drive axis X of the wobble member 68 oscillates in an oscillation plane O. As the drive axis X of the wobble member 68 oscillates, the mounting portion 94 of the oscillation member 70 oscillates. Because the spindle axis S of the spindle portion 40 passes through the wobble fulcrum P, the spindle portion 40 is driven to oscillate about the spindle axis S. The degree to which the spindle portion oscillates can be controlled by selecting an appropriate wobble angle A for the wobble shaft 60.

Figure 5:
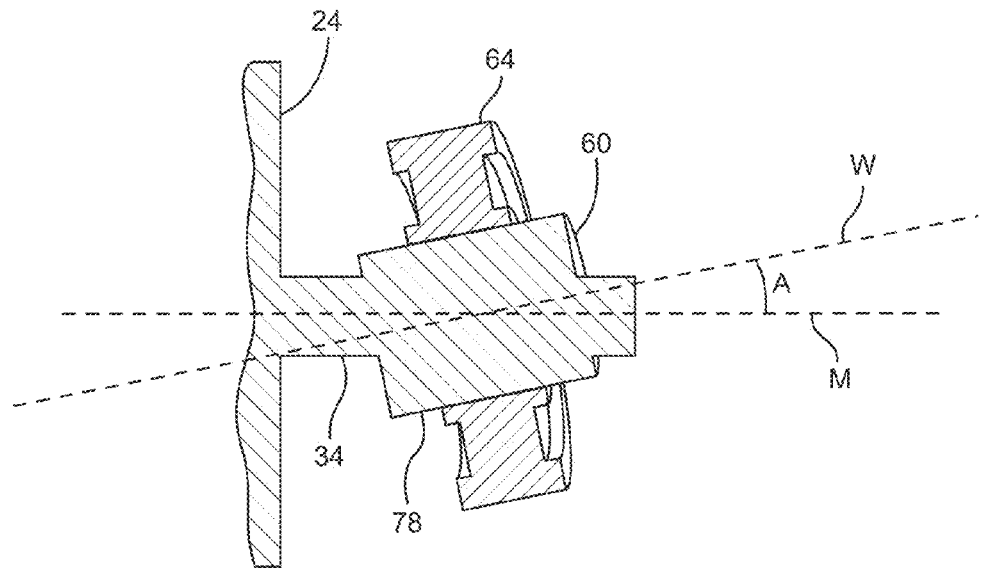
FIG. 5 is side cross-sectional view of the drive shaft of the motor and the wobble shaft and wobble bearing of the wobble drive mechanism.
Figure 6:
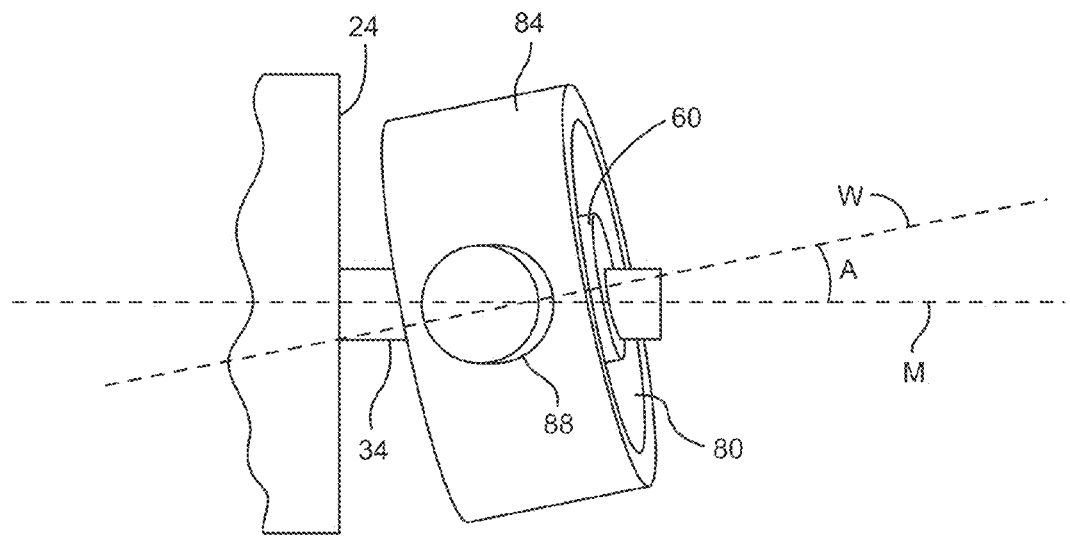
FIG. 6 is a side view of the drive shaft of the motor and the wobble shaft and wobble bearing of the wobble drive mechanism of FIG. 5 with the wobble member positioned on the wobble bearing.
Figure 7:
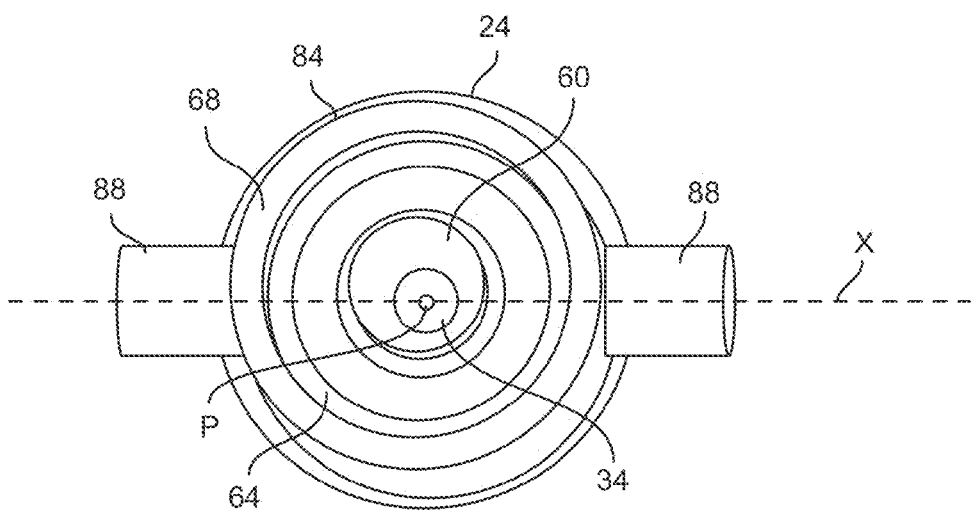
FIG. 7 is front view of the wobble member, wobble shaft, and wobble bearing of FIG. 6.
Figure 9A:
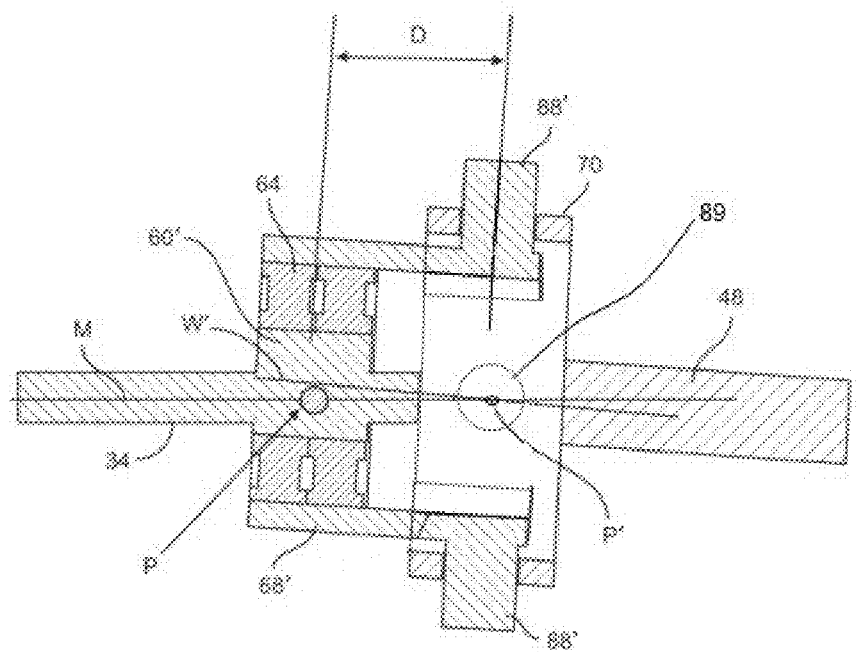
FIG. 9A is a top cross-sectional view of an embodiment of a wobble drive mechanism having a forwardly offset wobble fulcrum.

As depicted in FIG. 2, the motor axis M resides substantially in the oscillation plane O. In the embodiment of FIGS. 2-8, the motor axis (M), wobble axis (W), drive axis (X), and spindle axis (S) intersect each other at a wobble fulcrum point P that is centered on the wobble shaft 60 (FIG. 5). This configuration does not require much offset in front of the motor so the length of the tool can be minimized. In alternative embodiments, the wobble member and wobble shaft may have a configuration that allows the wobble fulcrum to be offset forwardly or rearwardly from the wobble shaft. For example, FIG. 9A depicts an embodiment of a wobble member 68' in which the wobble fulcrum is offset forwardly by a distance D. In this embodiment, the wobble member 68' extends forwardly from the wobble shaft 60 and wobble bearings 64 to locate the wobble drive structures 88' at a forward position to provide the desired offset distance D. As can be seen in FIG. 9A, the wobble shaft 60' is arranged such that the wobble axis W' intersects the motor axis M' at an offset fulcrum point P' that is located in front of the drive shaft 34 and wobble shaft 60'.

In this embodiment, the forward offset results in a clearance area or space being provided in the center of the wobble member 68 and oscillation member 70 in front of the wobble shaft 60 and drive shaft 34. This clearance space can be used to access a quick-change/tool-less blade clamping mechanism incorporated into the oscillation member 70. For example, the lower portion of the oscillation member 68 may be removed to provide access to the top of the spindle portion 40 of the oscillation member where a push button or other structure for a quick change blade clamping mechanism can be located.

Figure 9B:
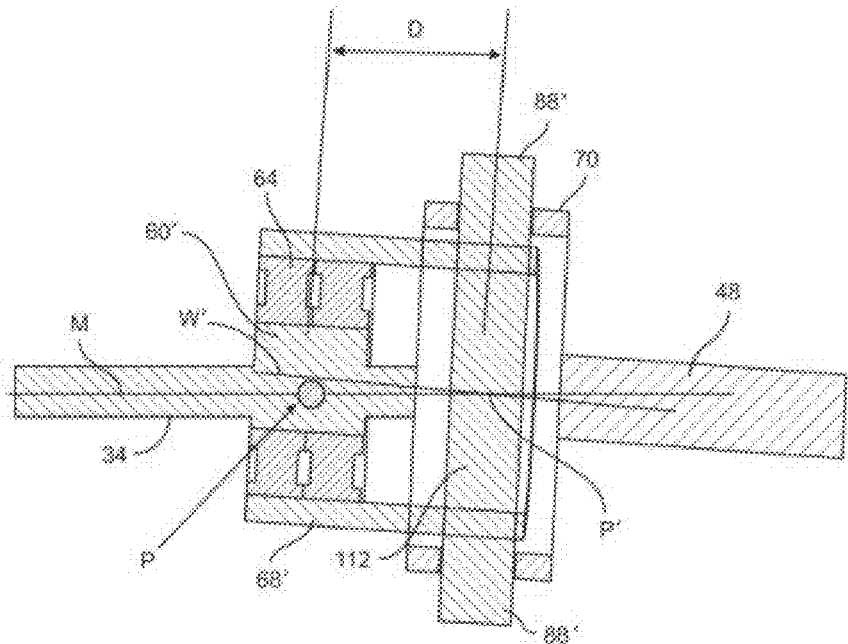
FIG. 9B is a top cross-sectional view of another embodiment of a wobble drive mechanism having a forwardly offset wobble fulcrum.
Figure 9C:
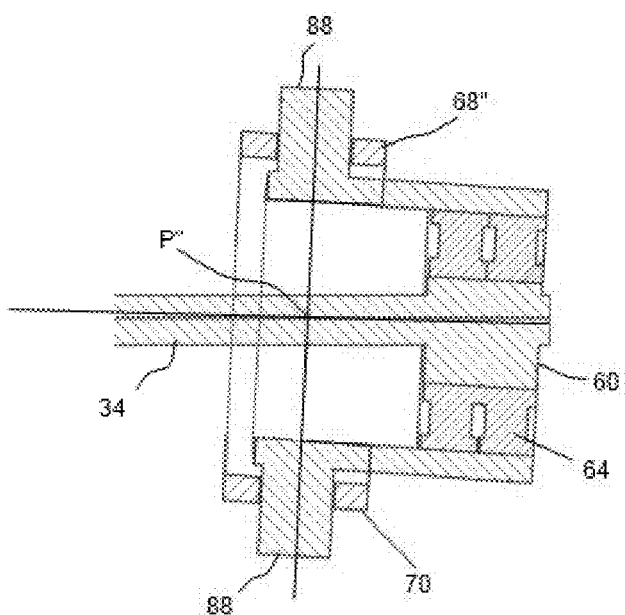
FIG. 9C is a top cross-sectional view of an embodiment of a wobble drive mechanism having a rearwardly offset wobble fulcrum.

FIG. 9B depicts another embodiment of a wobble member 68" having a configuration similar to the wobble member 68' of FIG. 9A resulting in a forward offset of the wobble fulcrum. As depicted in FIG. 9B, the forward offset configuration can also be used to enable the use of a continuous pin or post 112 in the wobble member 68' that extends through the wobble member 68' to provide the wobble drive structures 88'. The use of a continuous pin or post for the mounting structures can reduce the load on the wobble bearing during use. FIG. 9C depicts an embodiment in which the wobble fulcrum is offset rearwardly from the wobble shaft. In this embodiment, the cylindrical wall of the wobble member 68 extends rearwardly from the wobble shaft 60 to surround a portion of the drive shaft 34 so that the wobble axis W" intersects the motor axis M' at a fulcrum point P'" that is located behind the wobble shaft 60. This configuration provides a more compact arrangement for the power tool than the embodiment of FIGS. 2-8.

Figure 10:
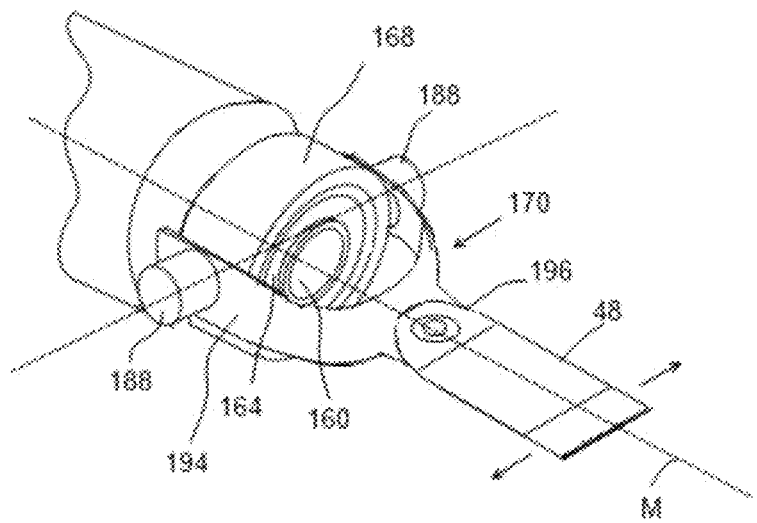
FIG. 10 is an exploded view of an alternative embodiment of a wobble drive mechanism in which the accessory tool is cantilevered from the drive mechanism.
Figure 11:
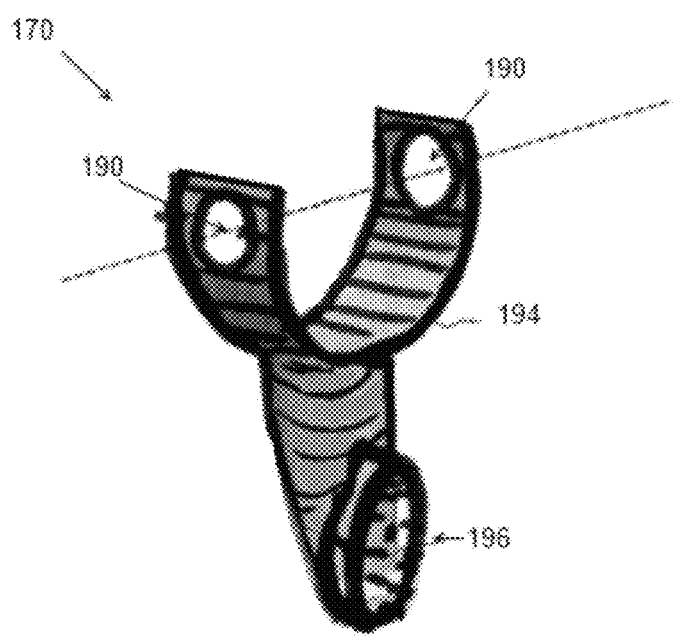
FIG. 11 is a perspective view of the oscillation member of FIG. 10.

An alternative configuration for a wobble drive for a power tool is depicted in FIGS. 10 and 11. In this embodiment, the wobble drive is configured to support an accessory tool, such as cutting blade 48, in a cantilevered position so that the accessory tool oscillates in a plane that is substantially aligned with the motor axis M as depicted in FIG. 10. In this embodiment, the wobble shaft 160, wobble bearing 164, wobble member 168 have substantially the same configuration as the corresponding parts in the embodiment of FIGS. 2-8 while the oscillation member 170 is configured differently than the oscillation member 70 of FIGS. 2-8.

Referring to FIG. 11, the oscillation member 170 in this embodiment includes a tool mounting portion 196 and a yoke portion 194. The blade mounting portion 196 is configured to removably attach an accessory tool to the oscillation member 170 and has a configuration similar to the tool holder 44. The yoke portion 194 comprises a wall structure that is configured to extend from the wobble drive structure 188 on one side of the wobble member 168 to the wobble drive structure 188 on the other side of wobble member 168 as depicted in FIGS. 10 and 11. As depicted, the yoke portion 194 includes mounting structures 190 in the form of openings that are configured complementarily to the wobble drive projections 188 provided on the wobble member 168 although in alternative embodiments the openings and projections may be switched between the oscillation member 170 and the wobble member 168.

The yoke portion 194 is configured to extend around the front of the tool to position the blade mounting portion generally in front of the wobble member 168 with the accessory tool aligned substantially with the motor axis M as can be seen in FIG. 10. When the wobble shaft 160 is rotated by the drive shaft, the wobble member 168 oscillates in a plane that is aligned with the motor axis M similar to the wobble member 68 of FIGS. 2-8. The wobble member 168 in turn causes the oscillation member 170 to oscillate the accessory tool in a plane that is also substantially aligned with the motor axis M as depicted in FIG. 10.

Figure 12:
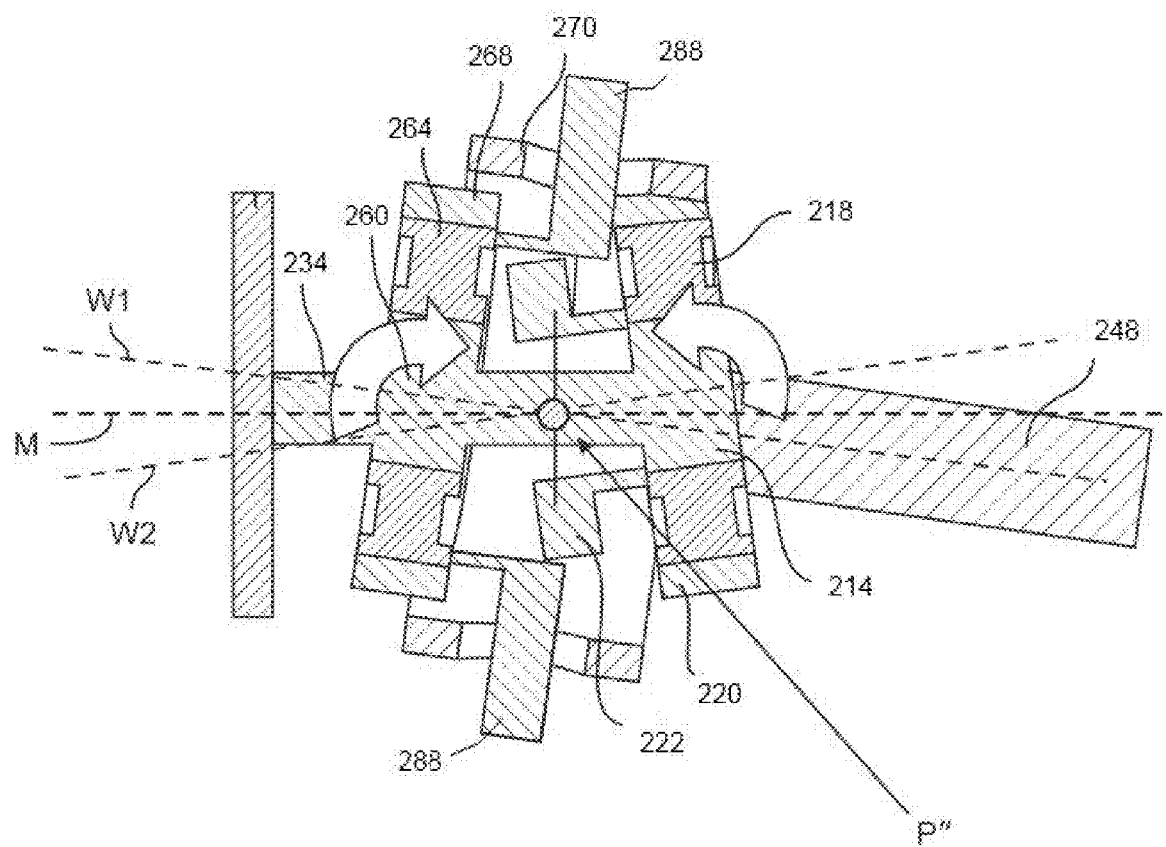
FIG. 12 is a top cross-sectional view of an embodiment of a dual wobble drive mechanism including a second wobble member for counterbalancing.

FIG. 12 depicts another alternative embodiment in which the power tool is provided with dual wobble mechanisms. In the embodiment of FIG. 12, a second wobble shaft 214 is provided on the drive shaft 234 of the motor forward of the first wobble shaft 260. The first wobble shaft 260 is arranged such that the first wobble axis W1 intersects the motor axis M at an intermediate fulcrum point P'" that is located between the first wobble shaft 260 and the second wobble shaft 214. The first wobble member 268 offsets the oscillation axis of the wobble member 268 forwardly so that it intersects the fulcrum P'".

The second wobble shaft 214 is arranged with the second wobble axis W2 also intersecting the intermediate wobble fulcrum P'". A second wobble bearing 218 is rotatably positioned on the second wobble shaft 214, and a second wobble member 220 is positioned on the second wobble bearing 218. The second wobble member 220 offsets the oscillation axis of the second wobble member rearwardly so that it also intersects the fulcrum P'".

The second wobble member 220 includes projections or similar-type features 222 that are used to restrain the second wobble member against the rotation of the drive shaft 234 and second wobble shaft 214. For example, the projections 222 on the second wobble member can be retained in slots or grooves (not shown) defined in the inner wall of the first wobble member 268. The first wobble member 268 is coupled to the oscillation member 270 and is used to drive the spindle portion (not shown) of the oscillation member 270 to oscillate about the spindle axis S. The second wobble shaft 214 is oriented to produce a wobbling/oscillating movement of the second wobble member 220 that opposes (i.e., 180° out of phase with) the wobbling/oscillating movement of the first wobble member 268. This opposed movement counters the vibrations generated by the movement of the first wobble member.

Figure 13:
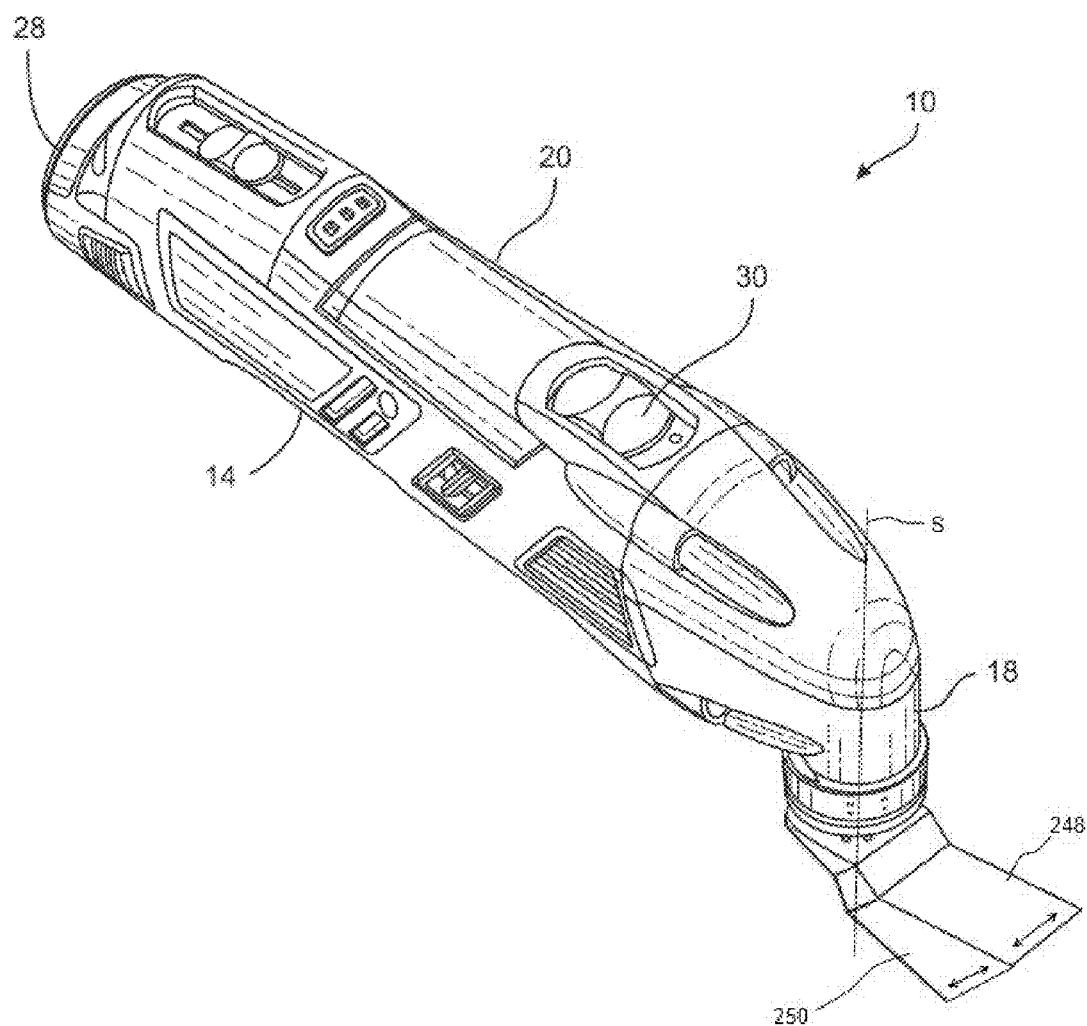
FIG. 13 is a perspective view of a power tool including a dual wobble drive mechanism for driving two cutting tools.

In accordance with another embodiment, a second wobble member, such as wobble member 220 depicted in FIG. 12, can be used to drive a second cutting tool. For example, referring to FIGS. 13 and 14, the second wobble member 220 can be used to drive a second oscillation member 272 which oscillates a second cutting tool 250 about the same axis S as and counter to the first cutting blade 248 which is oscillated by the first oscillation member 270.

Figure 14:
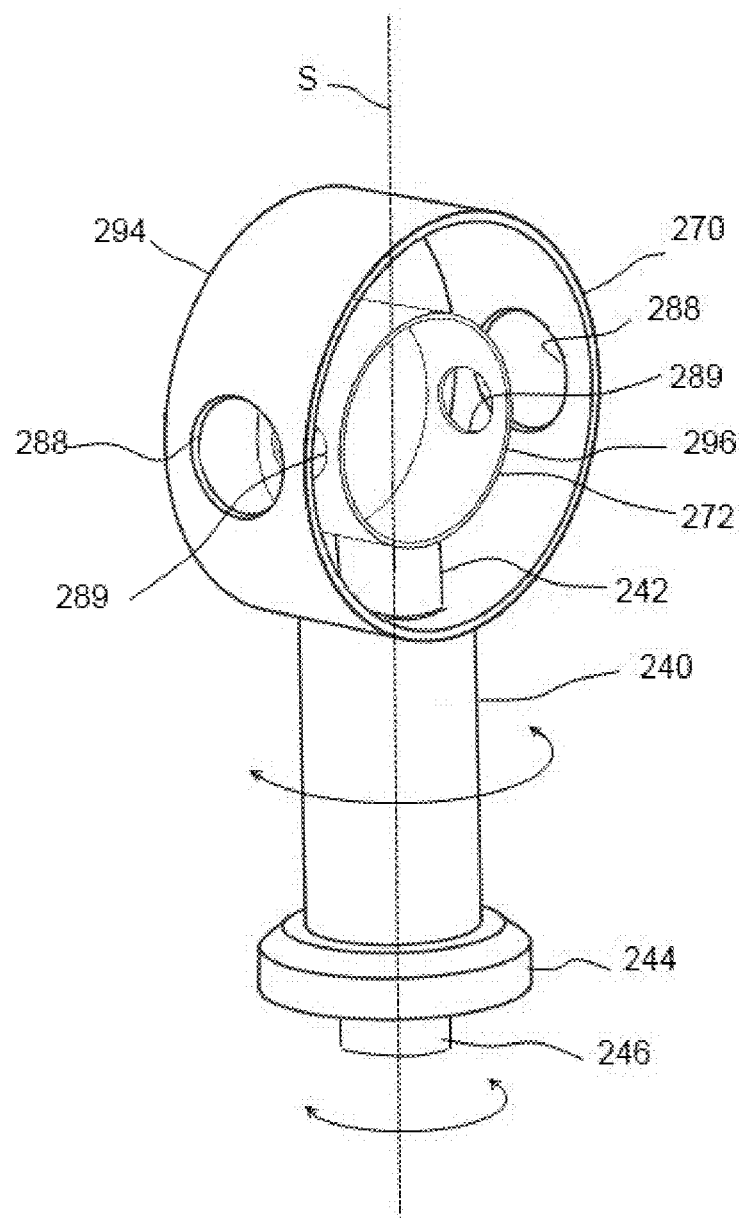
FIG. 14 is a perspective view of the oscillation members of the dual wobble drive mechanism of the power tool of FIG. 13.

FIG. 14 depicts an embodiment of the configurations for the first and second oscillation members 270, 272 that can be used to drive the first and second cutting blades 248, 250 to oscillate about the same axis. As can be seen in FIG. 14, the first oscillation member 270 comprises an outer oscillation member including an outer mounting portion 294 and an outer spindle portion 240. The outer mounting portion 294 includes wobble drive structures 288 that are configured to cooperate with the mounting structures 90 of the first wobble member 268. The outer spindle portion 240 includes a first tool holder 244 for removably securing the first cutting tool 248 to the first oscillation member 270.

The second oscillation member 272 comprises an inner oscillation member including an inner mounting portion 296 and an inner spindle portion 242. The inner mounting portion 296 is located substantially within the perimeter of the outer mounting portion 294 and includes mounting structures 289 that are configured to cooperate with the mounting structures 222 of the first wobble member 268 (FIG. 12). The inner spindle portion 242 is rotatably received within a passage defined in the outer spindle portion 240 such that the outer spindle portion 240 and the inner spindle portion 242 are each centered rotation about the same axis S. The inner spindle portion 242 includes a second tool holder 246 for removably securing the second cutting tool 250 to the second oscillation member 272. When the drive shaft 234 (FIG. 12) is driven to rotate about the motor axis M, the first wobble shaft 260 oscillates the first wobble member 268 which in turn causes the first oscillation member 270 to oscillate the first cutting tool 248. At the same time, the second wobble shaft 214 oscillates the second wobble member 220 which in turn causes the second oscillation member 272 to oscillate the second cutting tool 50.

Figure 15:
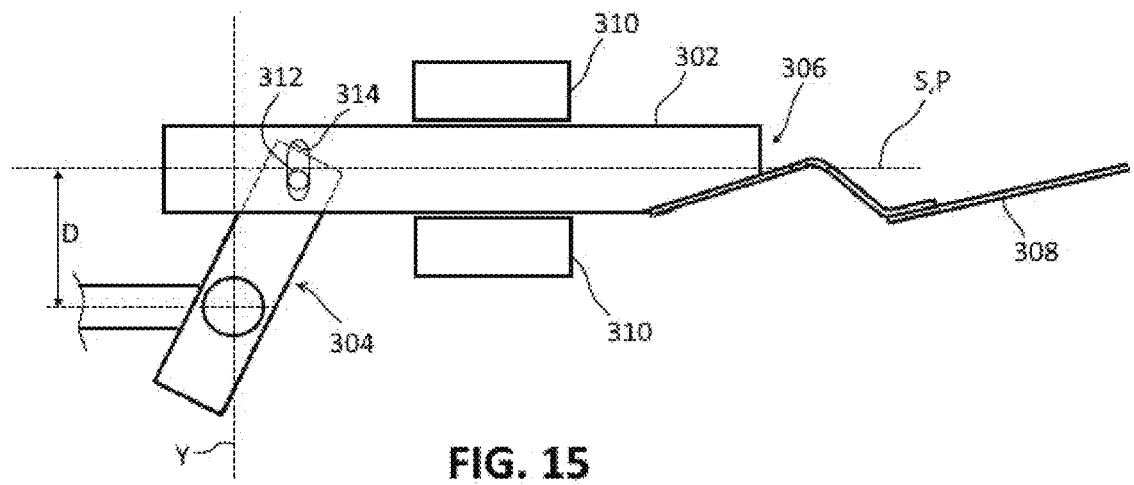
FIG. 15 is a perspective view of an elliptical wobble drive mechanism for a power tool.
Figure 16:
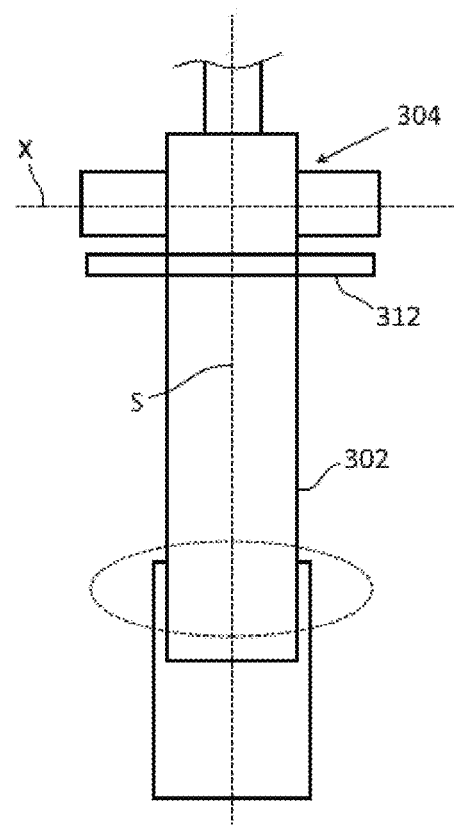
FIG. 16 is a top view of a portion of the elliptical wobble drive mechanism of FIG. 15.

FIGS. 15 and 16 depict an embodiment of a wobble drive system for generating an elliptical oscillating drive motion for the accessory tool. The elliptical drive motion is generated by offsetting the drive structures 88 of the wobble member from the motor axis such that the oscillation plane is substantially parallel to and offset from the motor axis. The offset position of the wobble drive structures 88 results in a center point of oscillation of the wobble drive axis defining an elliptical path in the oscillation plane.

Referring to FIG. 15, such a wobble drive includes a wobble shaft, wobble bearing, and a wobble member (not labeled in FIGS. 15 and 16) that are configured substantially the same as the wobble shaft, wobble bearing, and wobble member of FIGS. 2-8. The elliptical wobble drive includes a spindle member 302 and a spindle mounting assembly 304. The spindle member 302 comprises a longitudinal structure that defines a spindle axis S and includes a tool holder 306 at one end for removably securing an accessory tool 308.

The spindle mounting assembly 304 is configured to attach the spindle member 302 to the wobble member with the spindle axis S offset from the motor axis M and to convert the wobble motion of the wobble member into an elliptical motion of the spindle. In one embodiment, the spindle mounting assembly 304 is configured to convert the forward and rearward rotational movement of the wobble member into a forward and rearward linear movement of the spindle in the plane P, and to convert the side to side rotational movement of the wobble member into a side to side linear movement of the spindle in the plane P. In this manner, the wobble motion of the wobble member is converted to an elliptical drive motion for the spindle.

The spindle mounting assembly 304 may have any suitable configuration to enable the rotational movement of the wobble member to be converted to an elliptical movement of the spindle. In one embodiment, the spindle mounting assembly 304 includes constraining and guiding structures 310 associated with the spindle member 302 that are configured to restrict movement of the spindle member in directions perpendicular to the plane P. The spindle mounting assembly 304 also includes a pin member 312 that is slidably received within a slot 314 defined in the spindle member 302. The slot 314 in the spindle 302 is configured to allow the pin 312 to provide clearance for the pin to move within the slot in directions perpendicular to the oscillation plane without moving the spindle. The slot constrains movement of the pin with respect to the slot in directions parallel to the first plane so that movement of the pin in the oscillation plane is transferred to the spindle.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A power tool comprising:
    a housing including a main body portion and a nose portion, the nose portion defining an opening;
    a motor supported in the main body portion of the housing, the motor including an drive shaft that defines a motor axis;
    a first wobble shaft located on the drive shaft, the first wobble shaft defining a first wobble axis, the first wobble axis being arranged obliquely with respect to the motor axis;
    a first wobble member rotatably supported on the first wobble shaft and including a first wobble drive structure, the first wobble drive structure defining a first drive axis that is substantially perpendicular to the wobble axis; and
    a first tool driver moveably supported in the nose portion of the housing, the first tool driver including a first tool drive structure at one end that is coupled to the first wobble drive structure and including a first tool holder at the other end that is located exterior to the housing and is configured to releasably retain an accessory tool;
    wherein rotation of the drive shaft causes the first wobble shaft to wobble about the motor axis,
    wherein the first tool driver holds the first wobble member against the rotation of the first wobble shaft such that the first wobble member wobbles without rotating which results in an oscillating motion of the first drive axis of the first wobble member in a first plane that is parallel to the motor axis, and
    wherein the oscillating motion of the first drive axis causes the first tool driver to oscillate,
    wherein the first wobble axis, the first drive axis, and the motor axis intersect at a wobble fulcrum point, the wobble fulcrum point defining a center point of oscillation for the oscillating motion of the first drive axis, and
    wherein the first tool driver includes a first spindle portion that is rotatably supported in a passage in the nose portion of the housing for rotational movement about a first spindle axis.

2. The tool of claim 1, wherein the first spindle portion is supported such that the first spindle axis intersects the fulcrum point and is coaxial with the oscillation axis,
    wherein the oscillating motion of the first drive axis causes the first spindle portion to rotationally oscillate about the oscillation axis.

3. The tool of claim 2, wherein the first wobble shaft and the first wobble member are configured such that the first wobble axis, the first drive axis, and the motor axis intersect at a position that is offset in front of the first wobble shaft.

4. The tool of claim 2, wherein the first wobble shaft and the first wobble member are configured such that the first wobble axis, the first drive axis, and the motor axis intersect at a position that is offset behind the wobble shaft.

5. The tool of claim 2, further comprising:
    a second wobble shaft located on the drive shaft in front of the first wobble shaft, the second wobble shaft defining a second wobble axis, the second wobble shaft being arranged such that the second wobble axis is positioned obliquely with respect to the motor axis; and
    a second wobble member rotatably supported on the second wobble shaft and including a second wobble drive structure, the second wobble drive structure defining a second drive axis that is substantially perpendicular to the wobble axis.

6. The tool of claim 5, wherein the second wobble shaft and the second wobble member are arranged such that the second wobble axis and the second drive axis intersect the wobble fulcrum point.

7. The tool of claim 6, wherein the first wobble shaft, the first wobble member, the second wobble shaft, and the second wobble member are configured such that the first wobble axis, the first drive axis, the second wobble axis, and the second drive axis each intersect the motor axis at a common wobble fulcrum point.

8. The tool of claim 7, wherein the wobble fulcrum point is offset in front of the first wobble shaft and offset behind the second wobble shaft.

9. The tool of claim 8, wherein the second wobble shaft and the second wobble member are arranged with respect to the first wobble shaft and the first wobble member such that the oscillating motion of the second drive axis is approximately 180° out of phase with respect to the oscillating motion of the first drive axis.

10. The tool of claim 9,
wherein the first wobble member includes retaining features in which the second wobble drive structures are moveably retained,
wherein the retaining features hold the second wobble member against the rotation of the second wobble shaft such that second wobble member wobbles without rotating which results in an oscillating motion of the second drive axis in a second plane that is parallel to the first plane.

11. The tool of claim 9, further comprising:
a second tool driver including a second tool drive structure at one end that is coupled to the second wobble drive structure and a second spindle portion that is rotatably supported in a passage defined in the first spindle portion for rotation about the first spindle axis, the second spindle portion including a tool holder at a distal end thereof that is located exterior to the first spindle portion and is configured to releaseably retain an accessory tool;
wherein rotation drive shaft causes the second wobble shaft to wobble about the motor axis,
wherein the second tool driver holds the second wobble member against the rotation of the second wobble shaft such that the second wobble member wobbles without rotating which results in an oscillating motion of the second drive axis of the wobble member in a second plane that is parallel to the motor axis, and
wherein the oscillating motion of the second drive axis causes the second spindle portion to rotationally oscillate about the first spindle axis.

12. The tool of claim 1, wherein the first tool driver extends forwardly from the first wobble member in a direction that is substantially parallel to the motor axis, and
wherein the tool holder of the first tool driver is configured to retain an accessory tool such that the accessory tool oscillates in a plane that is substantially parallel to the motor axis.

13. The tool of claim 12, wherein the first wobble drive structure is positioned at an offset position such that the first drive axis is offset from the motor axis and the wobble axis and the first plane in which the first drive axis oscillates is substantially parallel to and offset from the motor axis, and
wherein the offset position of the first wobble drive structure results in a center point of oscillation of the first drive axis defining an elliptical path in the first plane.

14. The tool of claim 13, wherein the first tool driver includes a spindle portion that defines a spindle axis that lies in the first plane and includes a tool holder at a distal end thereof that is configured to releasably retain an accessory tool, and
wherein the spindle portion is moveably retained in the nose portion of the housing by guide structures, the guide structures configured to allow axial translation and oscillation of the spindle portion in the first plane and prevent movement of the spindle portion in directions transverse to the first plane.

15. A power tool comprising:
a housing including a main body portion and a nose portion, the nose portion defining an opening;
a motor supported in the main body portion of the housing, the motor including an drive shaft that defines a motor axis;
a first wobble shaft located on the drive shaft, the first wobble shaft defining a first wobble axis, the first wobble axis being arranged obliquely with respect to the motor axis;
a first wobble member rotatably supported on the first wobble shaft and including a first wobble drive structure, the first wobble drive structure defining a first drive axis that is substantially perpendicular to the wobble axis; and
a first tool driver moveably supported in the nose portion of the housing, the first tool driver including a first tool drive structure at one end that is coupled to the first wobble drive structure and including a first tool holder at the other end that is located exterior to the housing and is configured to releasably retain an accessory tool;
wherein rotation of the drive shaft causes the first wobble shaft to wobble about the motor axis,
wherein the first tool driver holds the first wobble member against the rotation of the first wobble shaft such that the first wobble member wobbles without rotating which results in an oscillating motion of the first drive axis of the first wobble member in a first plane that is parallel to the motor axis,
wherein the oscillating motion of the first drive axis causes the first tool driver to oscillate,
wherein the first tool driver extends forwardly from the first wobble member in a direction that is substantially parallel to the motor axis,
wherein the tool holder of the first tool driver is configured to retain an accessory tool such that the accessory tool oscillates in a plane that is substantially parallel to the motor axis,
wherein the first wobble drive structure is positioned at an offset position such that the first drive axis is offset from the motor axis and the wobble axis and the first plane in which the first drive axis oscillates is substantially parallel to and offset from the motor axis,
wherein the offset position of the first wobble drive structure results in a center point of oscillation of the first drive axis defining an elliptical path in the first plane,
wherein the first tool driver includes a spindle portion that defines a spindle axis that lies in the first plane and includes a tool holder at a distal end thereof that is configured to releasably retain an accessory tool, and
wherein the spindle portion is moveably retained in the nose portion of the housing by guide structures, the guide structures configured to allow axial translation and oscillation of the spindle portion in the first plane and prevent movement of the spindle portion in directions transverse to the first plane.

16. The tool of claim 15, wherein the first wobble drive structure includes a pin and the first tool drive structure includes a slot defined in the spindle portion through which the pin extends, wherein the slot extends for a distance above and below the first plane to provide clearance for the pin to move within the slot in directions perpendicular to the first plane without moving the spindle portion, and wherein the slot constrains movement of the pin with respect to the slot in directions parallel to the first plane such that movement of the pin in the first plane is transferred to the spindle portion.

\* \* \* \* \*